United States Patent [19]

Sheppard

[11] 4,273,029
[45] Jun. 16, 1981

[54] POWER STEERING GEAR WITH IMPROVED RESPONSIVENESS

[76] Inventor: Richard H. Sheppard, Hanover, Pa. 17331

[21] Appl. No.: 37,046

[22] Filed: May 8, 1979

[51] Int. Cl.³ .............................................. F15B 9/10
[52] U.S. Cl. ....................................... 91/422; 91/378; 137/625.69; 251/337
[58] Field of Search .................. 91/378, 422; 251/337; 137/625.67; 267/161, 162

[56] References Cited

U.S. PATENT DOCUMENTS

| | | | |
|---|---|---|---|
| 2,941,514 | 5/1957 | Jablonsky . | |
| 3,092,083 | 6/1963 | Sheppard | 91/378 |
| 3,107,905 | 10/1963 | Lucas | 267/161 |
| 3,856,242 | 12/1974 | Cook | 267/162 |
| 4,088,063 | 5/1978 | Sheppard | 91/378 |

Primary Examiner—Paul E. Maslousky
Attorney, Agent, or Firm—Lowe, King, Price & Becker

[57] ABSTRACT

An integral power steering gear includes a valve within the piston exhibiting improved responsiveness and overall operation. The piston incorporates a rack along the side in engagement with an output pinion. Dual washer springs are provided at the ends of the valve mounted in face-to-face, sliding contact. The spring rate that is thus doubled provides an improved response pattern for the power steering gear. The neutral flow of hydraulic fluid is reduced by narrowing the opening between the adjacent grooves in the valve and the piston. These features together give an improved performance envelope in both of the critical parameters; i.e., steering wheel movement versus net output and steering wheel torque input versus net output. Essentially, the envelope is substantially closed with these improvements giving the desirable improved responsiveness and better feel to the steering. With the spring rate doubled, better mechanical action of the valve including centering of the valve is obtained even under heavy loading and deflection of the piston due to engagement between the rack and pinion. Reduced travel of the springs results from the increased spring rate giving longer lived springs and assuring against permanent set in the springs. Because of quicker response, there is reduced incidence of bottoming out of the valve in the piston. The dual springs are also provided with a pre-load feature that can further increase the spring rate and insures the improved responsiveness and obviates any tendency for sponginess.

10 Claims, 5 Drawing Figures

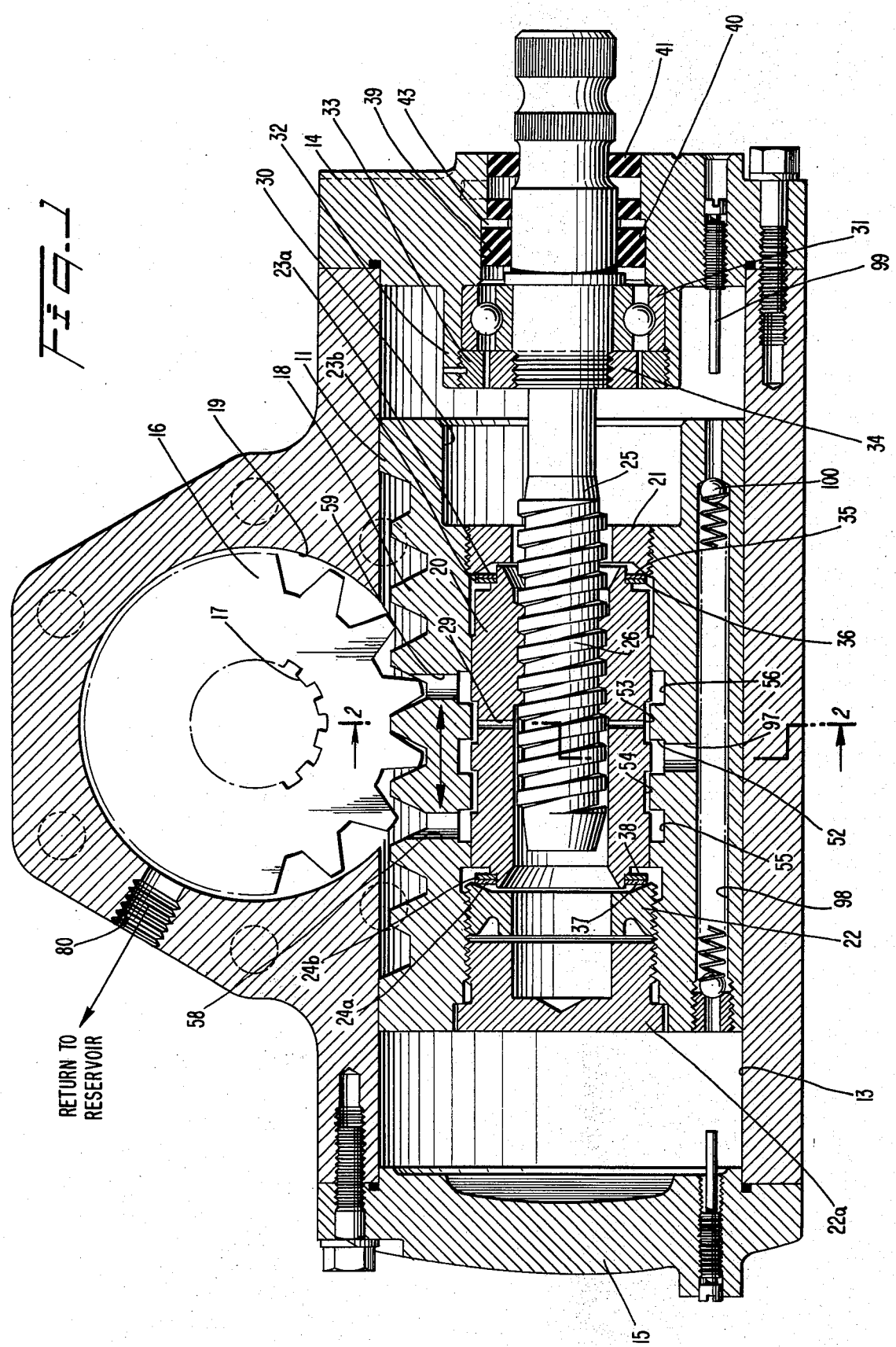

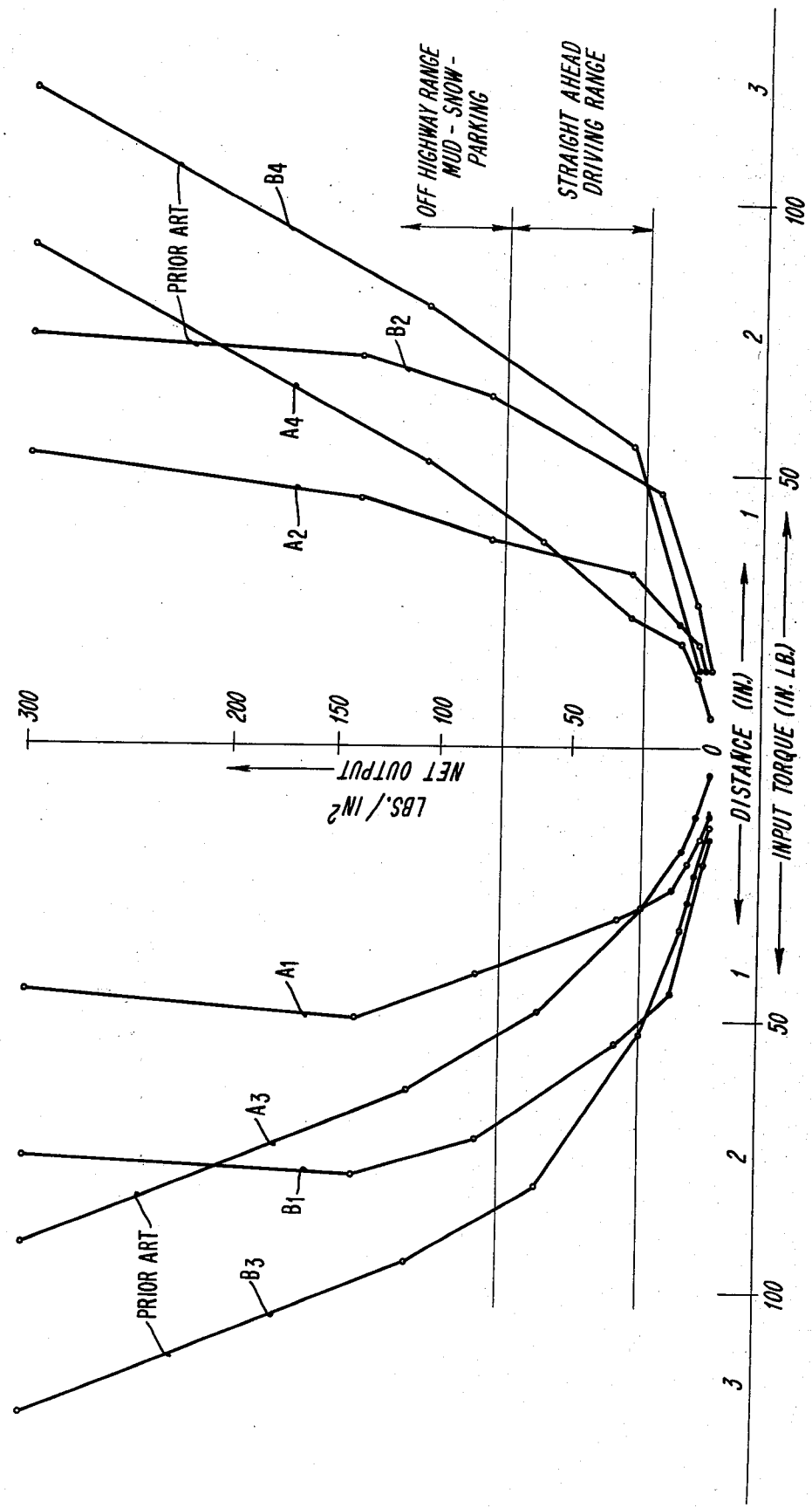

POWER STEERING GEAR WITH IMPROVED RESPONSIVENESS

FIELD OF THE INVENTION

The present invention relates to power steering gears, and more particularly, to a power steering piston and valve ehibiting improved responsiveness and overall operation.

BACKGROUND OF THE INVENTION

The present invention provides improvements in the power steering gear disclosed in my U.S. Pat. No. 4,008,063. This prior patent, among features provides for improved piston reversibility due to reduced friction between the piston and the cylinder of the unit, as a result of utilization of unique fluid bearings. This fluidized bearing concept is an improvement over my earlier U.S. Pat. No. 3,092,083, which discloses and claims the basic power steering gear with a distributing valve in the piston.

The invention of the prior improvement U.S. Pat. No. 4,088,063 provides a substantial net power output increase to the steering gear. However, the prior improvement does not provide improved responsiveness, i.e., reduced steering wheel movement to provide the same power output of the steering gear over the range of operation of the steering gear.

Basically, it has been found that the desired improved responsiveness may be obtained through the use of an increased spring force to center the valve within the piston. It has been discovered that the increased spring force is ideally provided by doubling the spring rate constant of the washer springs at the ends of the valve.

OBJECTIVES OF THE INVENTION

Thus, it is an object of the present invention to provide an improved power steering gear having a valve within the piston wherein increased spring force of the valve springs provides improved responsiveness of the gear. It is also one object of the present invention to provide a power steering gear with a valve within the piston which utilizes dual washer springs to thereby approximately double the spring rate so as to provide an improved response pattern for the power steering gear.

It is another and more specific object of the present invention to provide a power steering gear with a valve in the piston wherein the neutral flow of hydraulic fluid may be advantageously reduced by narrowing the opening between adjacent grooves in the valve and piston without adversely affecting the reversibility of the valve.

It is another object of the present invention to provide a steering gear, as described, exhibiting an improved performance envelope, including improved responsiveness and better feel to the steering.

Other more specific related objects of the present invention are (1) to provide better mechanical response, (2) to eliminate flat spots in the steering (sponginess), (3) to improve the centering characteristics (reversibility), and (4) to reduce the spring travel so as to provide longer life of the springs and to prevent permanent setting of the springs.

SUMMARY OF THE INVENTION

These and other objects are achieved by the present invention wherein there is provided an integral power steering gear having a distributing valve disposed within a piston with the valve being centered within the piston by means of dual washer spring assemblies mounted in opposition at the ends of the valve. Two washer springs rather than a single washer spring cause the spring rate to be doubled, resulting in an improved response pattern for the power steering gear. The dual springs are pre-loaded which further increases the spring rate and assures against any tendency for sponginess in operation. The higher spring force used to center the valve within the piston allows closer tolerances between the adjacent grooves in the valve and the piston to be used. This allows the neutral flow of hydraulic fluid to be reduced resulting in a savings of power consumption of the vehicle. These features together provide an improved performance envelope in both the parameters of (1) steering wheel movement versus net output, and (2) steering wheel torque input versus net output. The envelope is substantially closed with these improvements, giving the desired improved responsiveness and better feel to the steering.

The doubled spring rate provides better mechanical response and maximum road feel since no flat spots or sponginess in the steering are experienced. In addition, the centering effort of the valve is considerably improved by the doubled spring rate. The increased spring rate also results in reduced travel of the valve which assures longer lived springs and prevents permanent setting of the springs.

The washer springs are preferably flat and in juxtaposition so as not to have a tendency to take on a permanent set during use. Thus, the springs as they move also slide with respect to each other when under pressure. This beneficial sliding motion allows a doubled spring rate to be achieved with substantially no change in the effective spring rate over the life of the gear. In particular, I have found that the two springs with face-to-face sliding action between them provide the desirable substantially flat spring rate curve that is subject to virtually no change or variation even after extensive use.

Still other objects and advantages of the present invention will become readily apparent to those skilled in this art from the following detailed description, wherein I have shown and described only the preferred embodiment of the invention, simply by way of illustration of the best mode contemplated by me in carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE DRAWINGS

FIG. 4 is a more detailed partial cross-sectional view taken along line 4—4 of FIG. 2 showing an enlarged portion of the dual washer structure and spool valve with the washers in the compressed position;

FIG. 5 is a graph illustrating the improved responsiveness and performance envelope provided by the present invention.

DESCRIPTION OF THE PREFERRED EMBODIMENT

Figure 1:
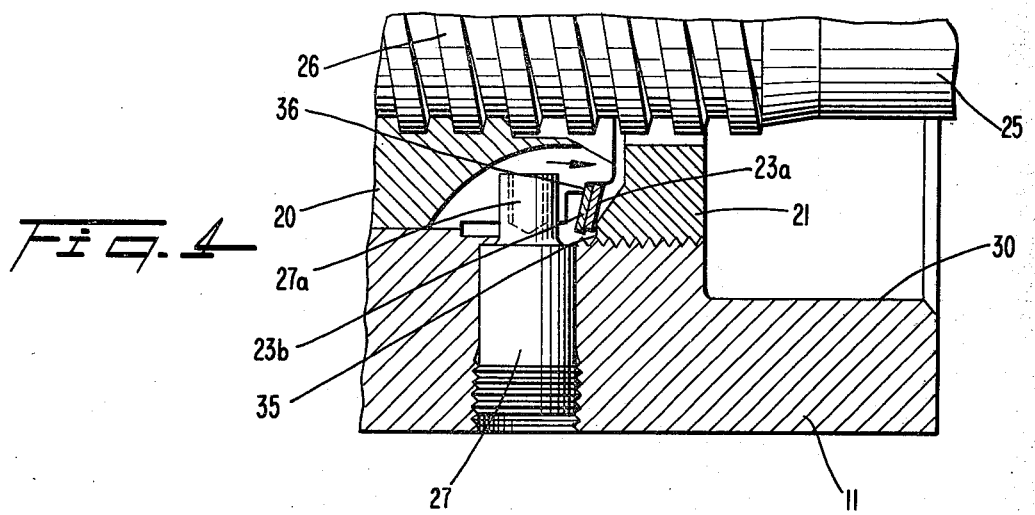
FIG. 1 is a cross-sectional view taken along the longitudinal axis of the power steering gear of the present invention.

For more complete understanding of the preferred embodiment of my invention, reference is first made specifically to my U.S. Pat. No. 4,088,063, the disclosure of which is hereby incorporated by reference. By comparison of the U.S. Pat. No. 4,088,063 patent with the present FIG. 1, it is clear that the power steering includes the basic parts of my previous power steering gear. To help in understanding the several features of the present invention, the basic parts of the gear have been numbered as follows: operating piston 11; gear housing 12 forming the cylinder 13; bearing cap 14 at a first end of the cylinder; and a cylinder head 15 at the opposite or second end; output gear 16 on output shaft 17 operated by rack 18 on the piston 11 and low pressure exhaust chamber 19 surrounding the output gear 16.

A reciprocating spool-type distributing valve 20 is disposed within the piston 11 at substantially the center of the piston almost directly over the output gear 16. Adjustably threaded retaining rings 21, 22 at opposite ends of the valve 20 center the valve between two assemblies of washer springs 23a, 23b, 24a, 24b. These rings allow pre-load adjustment of the springs 23a, 23b, 24a, 24b. The rings further serve to reinforce the piston at points equally spaced from the output pinion 16, as can clearly be seen from FIG. 1. Piston end cap 22a provides further reinforcement and closes the end of the piston.

Figure 2:
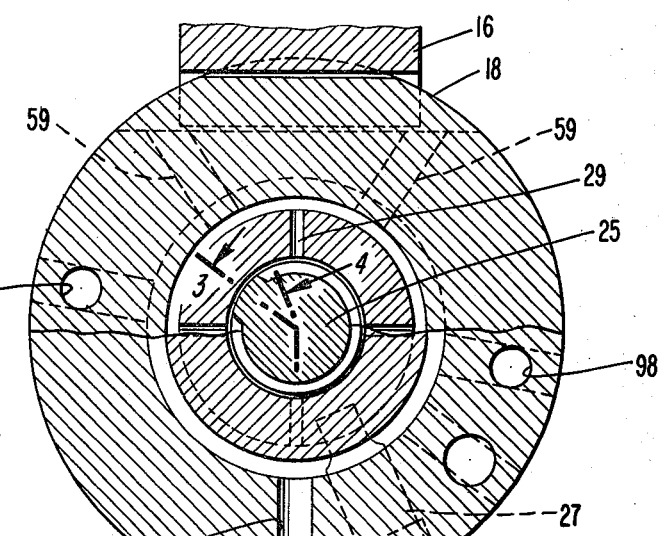
FIG. 2 is a partial cross-sectional view to be taken along line 2—2 of FIG. 1 illustrating the radial relationship of the several components of the power steering gear.

Input shaft 25 is threaded and threadingly engages valve 20 at threads 26. Guide pin 27 (see FIGS. 2 and 4) has a flattened area 27a which operates in a guide groove 28 formed in the nose of the valve towards the bearing cap end.

Just beyond the threads 26 towards the interior of the piston 11, is provided a plurality of bypass ports 29 that serve to equalize the pressure within the interior of the piston with that present in the first end (bearing cap end) of the cylinder 13. The composite size of the ports 29 is sufficient to allow the full volume transfer of hydraulic fluid in order to provide suitable reversibility of the piston during dynamic or unbalanced operation of the piston.

A recess 30 is formed in the first end of the piston 11, which allows bearing 31 of the input shaft 25 to be supported on an inwardly projecting annular portion 32. Retaining nuts 33, 34 cooperate with the outer and inner races of the bearing 31, respectively. The center bore 39 of the bearing cap 14 supporting bearing 31 houses an inner high pressure seal member 40 and an outer weather or salt seal 41.

A pressure source or pump (not shown) is connected to the steering gear 11 through an input orifice 50 (FIG. 3) communicating with distributing slot 51a in turn feeding fluid inlet passage 51 allow uninterrupted feed at any position the piston may travel along the cylinder 13. Passage 51 connects to annular groove 52 in the bore of the piston at the center of distribution valve 20. Annular grooves 53, 54 in the outer face of the valve 20 split the incoming high pressure fluid from groove 52 into two equal parts when the gear is in the stanby or neutral condition. Outer annular grooves 55, 56 provide alternate power and exhaust flow to the piston ends. The exhaust passages 58, 59 at the bottom of the piston interconnect the grooves 55,56 to exhaust chamber 19. Outlet orifice 80 returns the exhausted fluid to the system reservoir (not shown).

The annular groove 52 is also in communication with relief transfer passage 97 (FIG. 1), which in turn connects with the longitudinally extending blow-down passage 98. At the limit of travel of the piston towards either end of the cylinder, a stop member 99 unseats a ball valve 100 allowing pressure in the groove 52 to be relieved through the appropriate feed passageways to the exhaust chamber 19. When the steering gear thus is in the full travel position in either direction, the pressure in the fluidized sections of the piston is equalized and low (at substantially exhaust pressure). As the piston is moved free of the stop 99, the valve 100 is closed and the piston once again becomes operable.

Figure 3:
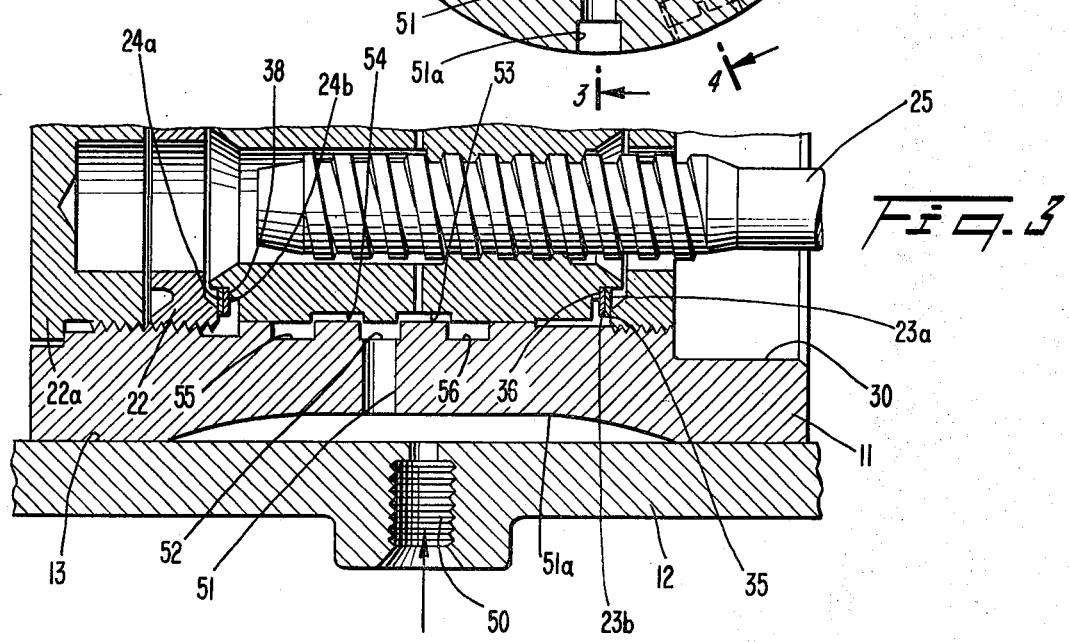
FIG. 3 is a partial detailed cross-sectional view taken along line 3—3 of FIG. 2 illustrating the valve within the piston and the positioning of the dual washer springs.

Referring now to the cross-sectional view of FIG. 3, the relationship of the dual washer springs 23a, and 23b, 24a and 24b of the valve in the piston assembly is shown in detail. It should be understood that only one pair of the washer springs 23a, 23b need be explained since the other pair 24a, 24b are constructed and arranged in a similar manner. Washer springs 23a and 23b are mounted in juxtaposition between the retaining ring 21 and the nose of spool valve 20. Inner washer spring 23b abuts around its inner periphery a stop or ledge 36 on the nose. Outer washer spring 23a engages around its outer periphery a shoulder 35 formed on retaining ring 21. From FIGS. 1 and 3, it is apparent that washer springs 24a and 24b are arranged in the same manner at the opposite end of spool valve 20 and abut shoulder 37 and stop 38. Washer springs 23a, 23b, and 24a, 24b, are formed having substantially the same dimensions and spring rates.

From FIG. 4, it can be seen that a certain amount of beneficial movement is provided between the washer springs 23a, 23b. As shown, when washer springs 23a, 23b are placed under compression loads (such as full right-hand movement of valve 20) the tendency is for the contacting, facing portions of washer springs 23a and 23b to move or slide with respect to each other. Washer springs 24a and 24b operate in a like manner when placed under loads by valve 20.

The use of dual washer springs provides a double spring rate while allowing only a small amount of flexing due to the sliding engagement of the washer spring faces. A single spring having a comparably doubled spring rate over that used in my prior design would be far too large to be used in the described steering gear system. In addition, a single stiffer spring is more likely to become permanently set under prolonged or extreme loads, tending to lower the spring rate introduce sponginess and undesirable flat spots in the steering.

Doubling of the spring rate provides a greatly improved response pattern for the power steering gear. Under both normal highway and off highway driving, this provides maximum responsiveness, that is, minimum input movement and torque to the steering wheel is required for the desired net output of the gear. Reduced travel is another advantage of the increased spring rate giving longer lived springs and assuring against permanent set in the spring since the springs move very slightly with respect to each other along the faces under high loads. The doubled spring rate provided by the paired springs also reduces the incidence of bottoming out of the valve 20.

The centering effort of the valve is considerably improved by the double spring rate over that exhibited by single spring washers. This means that deflection of the piston 11 that might occur under abnormally high loading between the pinion 16 and the rack 18 cannot adversely affect the centering function.

The clearance between the adjacent valve piston distributing grooves, that is, the spacing between grooves 52 and 53, 54, and 53 and 56, and 54 and 55, respectively, are desirably narrowed. The neutral flow of hydraulic fluid is reduced, thus saving power consumption of the vehicle while in the stand-by mode. Also, the narrower gap between the grooves of the valve 20 and piston 11 helps to improve its responsiveness, i.e., this structural change reduces the amount of mechanical movement of the steering wheel necessary to operate the power steering gear of the present invention. This improved responsiveness is an important key to the present invention.

Although the exact clearance between the mating grooves in the neutral or centered position of the valve 20 may vary, I have found that it can be reduced roughly in half from prior designs. A preferred embodiment of the invention provides a clearance in the range of 0.005–0.007 inch between the grooves 52–53, 54, for example.

In addition to the features and advantages mentioned above, each pair of dual washer springs 23a, 23b and 24a, 24b is preloaded to increase further their spring rate and insure against any tendency for sponginess. In addition, any tendency toward permanent setting of the springs is alleviated since the amount of possible reduction in spring rate due to setting will not exceed the normal amount of the preload.

By preloading washers 23a, 23b and 24a, 24b, the valve-piston assembly is assured of the positive centering action. The initial centering of the valve and amount of preloading is adjusted by movement of the retaining rings 21, 22 and then these rings are permanently staked in position during manufacture.

The above described features of the power steering gear 10 of the present invention provide for the improved responsiveness, which can be seen by reviewing the graph of FIG. 5. The graph represents the performance envelope in both of the critical parameters of responsiveness, namely, (1) steering wheel movement versus net output represented by curves A1, A2 and (2) steering wheel input torque versus net output, as represented by curves B1, B2. For comparison, the prior art corresponding curves are shown as A3, A4 and B3, B4, respectively.

In comparing the response pattern curves of the present invention, A1, A2, to the prior art curves A3, A4, it should be noted that the envelope is substantially closed or tighter than before. In other words, moving along the increments of the X axis, it can be seen that for a given pressure output of the steering gear along the Y axis that substantially less steering wheel movement is required. Note that in both straight ahead driving range and the off-highway range that there is substantially a fifty percent improvement in performance.

Likewise, in the comparison of the torque input to the steering wheel (X axis) versus the net output (Y), the curves of the steering gear of the present invention, B1, B2, over the operational ranges of the gear is substantially better than the prior art gear, curves B3, B4. Particularly, in the off-highway range of driving, where the input torque becomes most critical, it can be seen that the steering gear of the present invention substantially outperforms the prior art steering gears.

Thus, it can be seen that the use of dual washer springs to center and bias the valve 20 of the described power steering system provides a distinct advantage over prior art single spring designs, namely, improved responsiveness of the steering system. There are, in addition, other advantages, such as better road feel, and a reduced tendency for setting of the springs. While the power steering system of the present invention has been described in considerable detail, it is understood that various changes and modifications may occur to persons of ordinary skill in the art without departing from the spirit and scope of the invention as defined in the appended claims.

What is claimed is:

1. In a power steering gear having a reciprocating power piston in a cylinder, a valve within the piston having distribution grooves to selectively distribute pressurized fluid to a first and second end of the piston within the cylinder for steering action, a steering input shaft operatively engaging the valve, and an output means in engagement with said piston, the improvement comprising:
   first and second washer spring assemblies mounted in opposition to each other adjacent the ends of said valve,
   dual washer springs in each assembly and being substantially flat and mounted adjacent each other whereby a substantially increased spring rate is obtained to provide comparable increased responsiveness of said valve.

2. The power steering gear of claim 1 wherein each of said dual springs of said assemblies has substantially equal spring rates and held under slight preload compression.

3. The power steering gear of claim 2 wherein said dual springs provide a substantially double spring rate over that of an equal size single spring.

4. The power steering gear of claim 3 wherein said dual springs are mounted in juxtaposition to each other and are slidable with respect to each other when the valve is actuated.

5. The power steering gear of claim 4 wherein is provided means to substantially equally preload the springs whereby to further increase the spring rate.

6. The power steering gear of claim 1 wherein the clearances between adjacent cooperating distribution grooves is inversely proportional to the spring rate and in the range of 0.005 to 0.007 inches.

7. The power steering gear of claim 2 wherein said valve is positioned approximately at the center of said piston and opposite said output means, and includes adjustable retaining rings at the ends of said valve and adjacent said dual spring biasing means for locating said valve and for adjusting the preload compression of said springs.

8. An integral power steering gear comprising: a cylinder; a reciprocating power piston disposed within said cylinder; a valve disposed within said piston to selectively distribute pressurized fluid to a first and second end of said piston within said cylinder for steering action, said valve and said piston including adjacently disposed fluid distribution grooves with substantially narrow hydraulic fluid flow clearances between said fluid distribution grooves; a steering input shaft operably engaging said valve; first and second washer spring assemblies mounted in opposition to each other adjacent the ends of said valve; dual washer springs in each assembly and being substantially flat and mounted adjacent each other whereby a substantially increased spring rate is obtained to provide comparable increased responsiveness of said valve when actuated by said input shaft.

9. The power steering gear of claim 8 wherein said dual springs provide a substantially double spring rate over that of an equal size single spring.

10. The power steering gear of claim 9 wherein said dual springs are mounted in juxtaposition to each other and are slidable with respect to each other when the valve is actuated.

* * * * *